United States Patent [19]
Lenkoff

[11] Patent Number: 6,152,449
[45] Date of Patent: *Nov. 28, 2000

[54] COMBINED STICKER AND INVISIBLE INK GAME

[75] Inventor: Roger J. Lenkoff, Louisville, Ky.

[73] Assignee: Stry-Lenkoff Co., Louisville, Ky.

[*] Notice: Under 35 U.S.C. 154(b), the term of this patent shall be extended for 4 days.

[21] Appl. No.: 08/757,749

[22] Filed: Nov. 26, 1996

[51] Int. Cl.[7] .................................................. A63F 9/00

[52] U.S. Cl. ........................ 273/240; 946/147; 434/328; 434/81; 434/428; 283/97

[58] Field of Search ........................... 273/240; 434/328, 434/327, 81, 428; 446/147; 283/97

[56] References Cited

U.S. PATENT DOCUMENTS

| 4,212,393 | 7/1980 | Lenkoff | 206/575 |
| 4,586,714 | 5/1986 | Lenkoff et al. | 273/157 R |
| 4,714,275 | 12/1987 | Engel et al. | 281/15 R |
| 5,215,956 | 6/1993 | Kawashima | 503/201 |
| 5,217,231 | 6/1993 | Landis | 273/429 |

Primary Examiner—Benjamin H. Layno
Attorney, Agent, or Firm—Polster, Lieder, Woodruff & Lucchesi L.C.

[57] ABSTRACT

An association game including an overall image a portion of which is in latent invisible form to be developed by a marking means to provide an identifying configuration for a visible portion movably compatible with the latent image developed portion.

9 Claims, 4 Drawing Sheets

COMBINED STICKER AND INVISIBLE INK GAME

BACKGROUND OF THE INVENTION

The present invention relates to a unique combination of games and more particularly, to a unique and novel association and location identification game wherein a portion of an overall image is printed invisibly which when marked visible to a viewer identifies a second portion configuration of a third visible portion which then can be located and movably associated with the marked visible second portion to enhance comprehension of the overall image.

Segmented games which can be used for both fun and teaching instruction have been long known in the art. Some of these games have employed pieced movable stickers which can be moved from one area to another to be assembled to form a preselected complete picture image. Such a game utilizing matching identifying numerals is disclosed in various sticker books such as Landsall, Inc. Le Sticker Book entitled, "The Taming of LePew" and in U.S. Pat. No. 4,586,714, issued to Leon G. Lenkoff et al on May 6, 1986 wherein stickers are moved from a random or jumbled sticker sheet to an image forming sheet with the assistance of visibly marked compatible identification numerals on a moveable sticker in one area and the place it is to be moved in another area. Another type of sticker game which employs a comparatively complex utilization of a transparency decoder for a sticker location can be found in U.S. Pat. No. 4,714,275, issued to James E. Engel et al on Dec. 22, 1987. Further, image games utilizing invisible ink to complete images in color and to complete images in segments are also known in the art, attention being directed to U.S. Pat. No. 4,212,393, issued to Leon G. Lenkoff on Jul. 15, 1980 and to U.S. Pat. No. 5,217,231 issued to Thomas J. Landis, on Jun. 8, 1993, respectively.

The present invention recognizing the simplicity and lack of obversvational challenge in using compatible visible identifying numerals, provides for utilization of a more interesting and more observationally challenging latent image portion configurations to be made visible by a game player as part of a much more observationally challenging location game. The present invention recognizes and combines some of the known broad features as taught by the formerly known aforementioned games, particularly the known feature of employing moving partial image stickers from one defined area of a game to another defined area of such game to complete an overall image and the further known feature of the utilization of invisible ink to develop an image. The novel and inventive combination of sticker and invisible ink games to provide a new and useful, more observationally challenging, game arrangement as disclosed herein is comparatively economical and straightforward in manufacture and assembly in mass quantities, providing an entertaining, more observationally challenging, educational game but still requiring a minimum of assembly steps on a players part. Further, the present invention provides for the utilization of both revealing mystery and the more observationally challenging and sophisticated identifying assistance to a youthful player, so that such player might logically and sequentially produce a clear, continuous and completed picture image when the several parts of the challenging and inventive combination are correctly recomposed.

Various other features of the present invention will become obvious to one skilled in the art upon reading the disclosure set forth hereinafter.

BRIEF SUMMARY OF THE INVENTION

More particularly, the present invention provides an association and location identifying game comprising: at least one sheet of material, the sheet having at least a first portion of less than an overall image visibly printed thereon and at least a second portion to assist in completion of such overall image invisibly printed thereon as a latent portion; a marking means for developing the second latent portion of such image to visibly identify in configuration form at least a third visible portion of such image to be located and associated with the second visibly developed latent image portion when so developed by the marking means; and, at least a compatible visible image third portion removed from the first and second portions of such image to be selectively and movably associated with the second latent image so marked and developed portion of the overall image to enhance a fuller comprehension of such overall image. In addition, the present invention provides for the utilization of the aforedescribed novel sheet game in book form with compatible invisible ink writings to be developed on some of the sheet sand for the utilization of the inventive game with other sheet games that can employ the same marking means for image development. Further, the present invention provides for visible image third portions in the form of an arrangement of adhesive pressure stickers located in random and scrambled form for selection from a separate sheet which can be part of such booklet package.

It is to be understood that various changes can be made by one skilled in the art in one or more of the several parts of the inventive game disclosed herein without departing from the scope or spirit of the present invention. For example, magnetically attracted image portions can be utilized in place of pressure stickers in the location and selection of overall image completers. Further, the image completion portions could, in and of themselves, be only partially complete with latent invisible ink identifying portions thereon to be completed with the same marking means.

BRIEF DESCRIPTION OF THE SEVERAL VIEWS OF THE DRAWINGS

Referring to the drawings which disclose the several parts of the inventive association game.

DETAILED DESCRIPTION OF THE INVENTION

Figure 1:
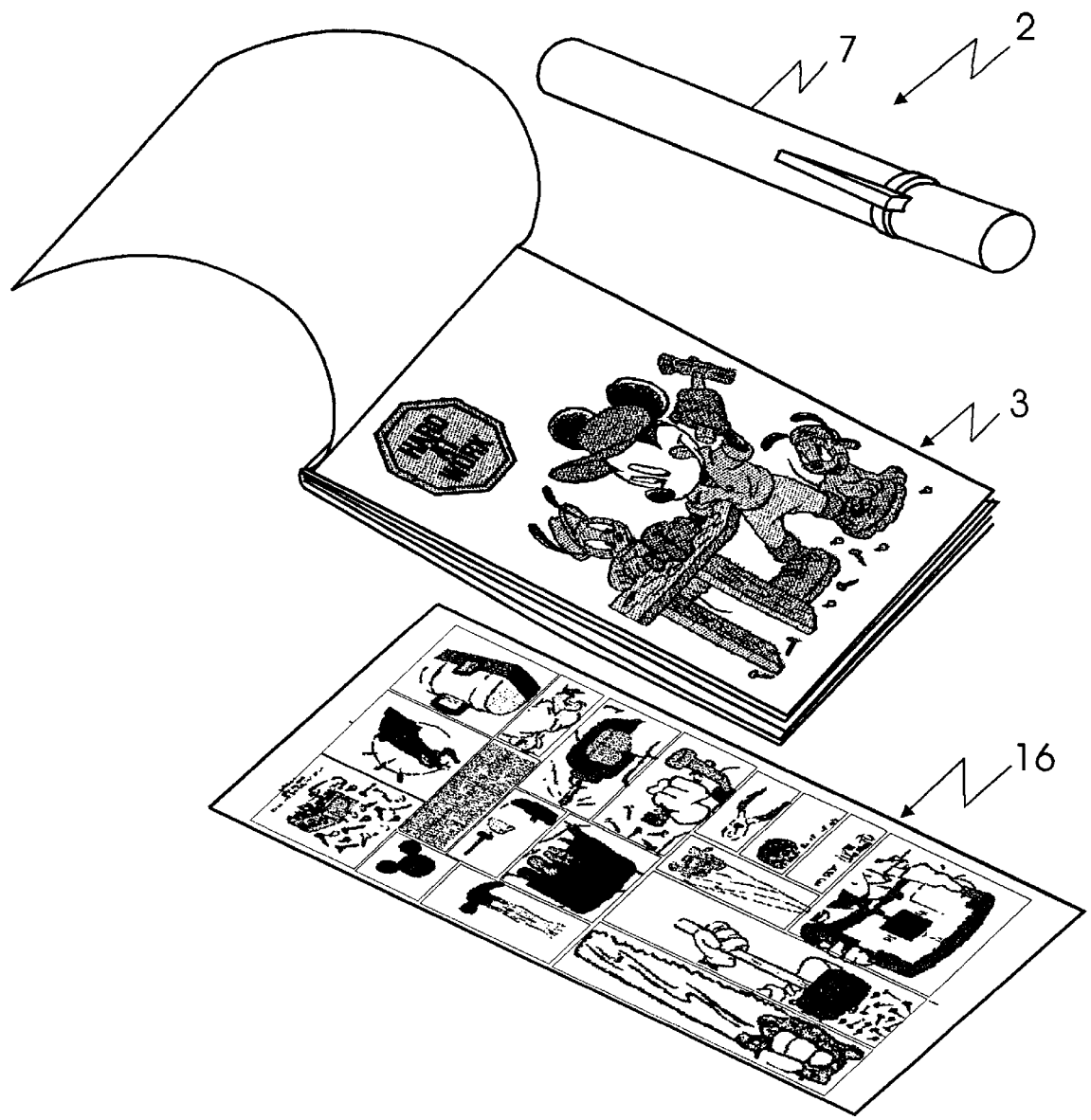
FIG. 1 is an isometric exploded view of a booklet package incorporating the several sheets of the invention including a marking pen cooperable with such sheets.
Figure 2:
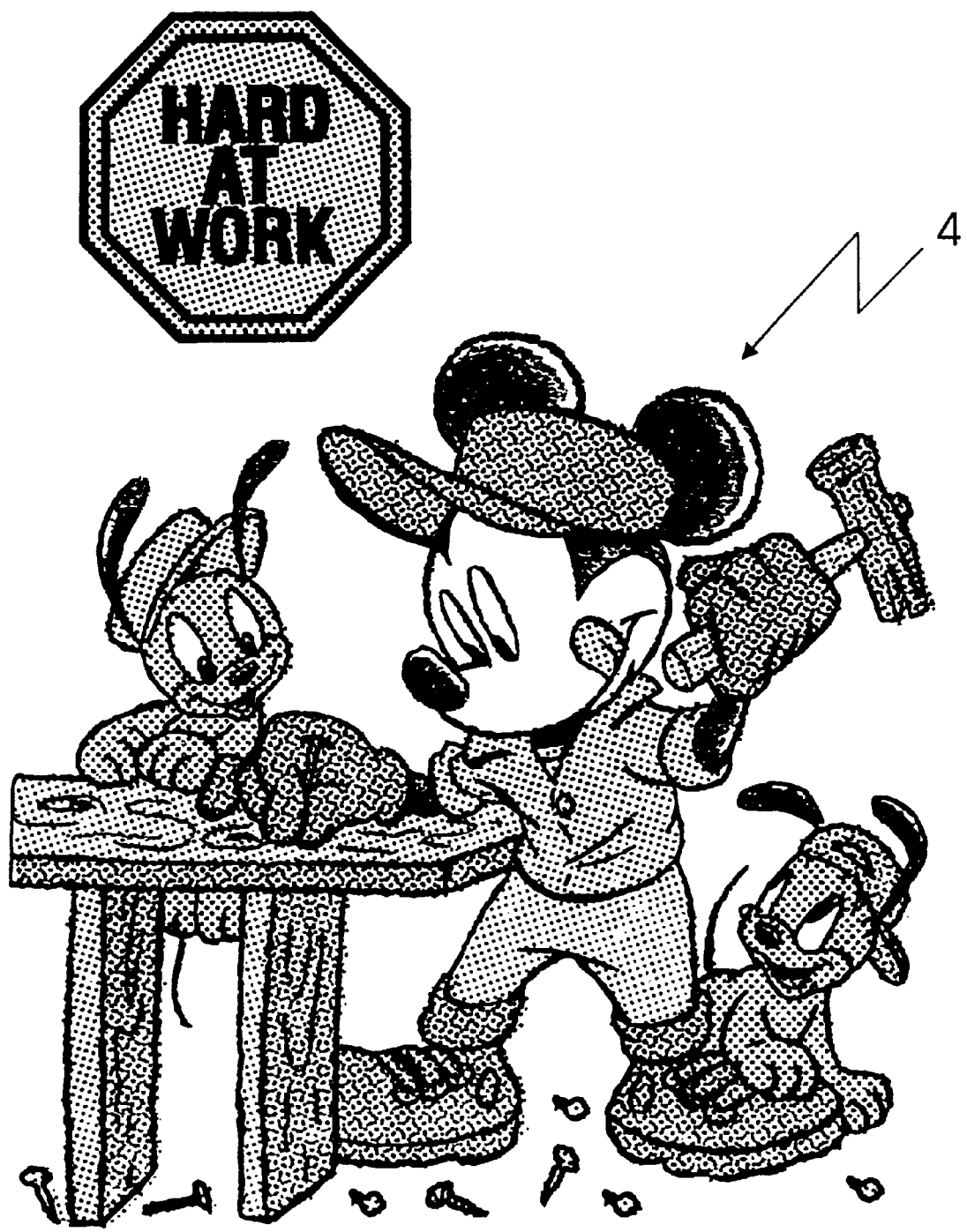
FIG. 2 is a typical marking sheet of the book package of FIG. 1 disclosing a full overall visible image with a selectively latent, color soluble dot treatment capable of being developed by the marking pen of FIG. 1 to provide a colored image.
Figure 3:
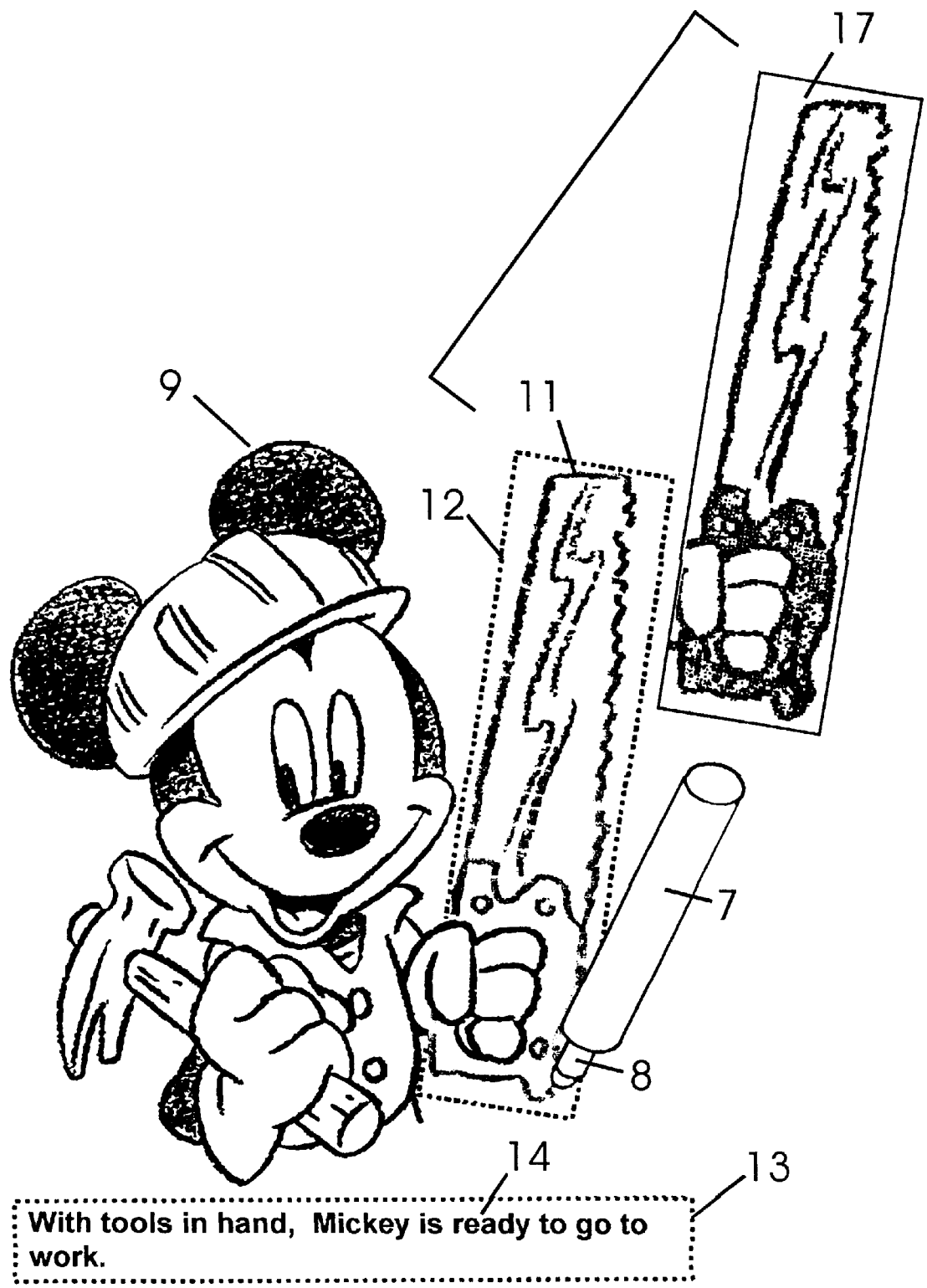
FIG. 3 is another typical marking sheet of the book package of FIG. 1 disclosing a first portion of a visible image with a second portion of such overall image surrounded by a visible dotted outline to include a portion of the image which had been invisibly printed thereon as a latent image and subsequently developed by the marking pen as shown in FIG. 1 to visibly identify in configuration form the second portion of the image, including in exploded form the compatible sticker to be placed within the outline.

As can be seen in FIG. 1 of the drawings, the inventive book package 2, which can be transparently wrapped, is disclosed incorporating licensed and copyrighted figures of Disney Enterprises, Inc. These licensed figures are shown in various scenes, each printed on one of the several sheets of booklet 3. The sheets of booklet 3 as disclosed include two types of invisible ink games, one of which games can be broadly described as an invisible ink image coloring game 4 (FIG. 2) and the other of which can be broadly as a partial ink image and sticker game 6 (FIG. 3). As aforementioned, each of the several sheets of book 3—which sheets can be of a suitably treated paper material—can incorporate one or more of the aforedescribed two types of invisible ink games 4 and 6. The several sheets of booklet 3 incorporate various scenes to be contacted by a game player with a contact pen 7 which forms part of book package 2. In the invisible ink image coloring game 4, as disclosed in FIG. 2 of the drawings, when the insoluble dot imprints of ink are contacted by a felt tip 8 on contact pen 7, the water in the contact pen 7 is deposited on the paper and releases the latent or invisible coloring material, thereby spreading it on the adjacent locality of the paper to develop a fully colored image. This invisible ink image coloring game 4 as can be seen in FIG. 2 of the drawings, is similar to the coloring game, which is fully described in detail in the abovenoted U.S. Pat. No. 4,212,393.

Figure 4:
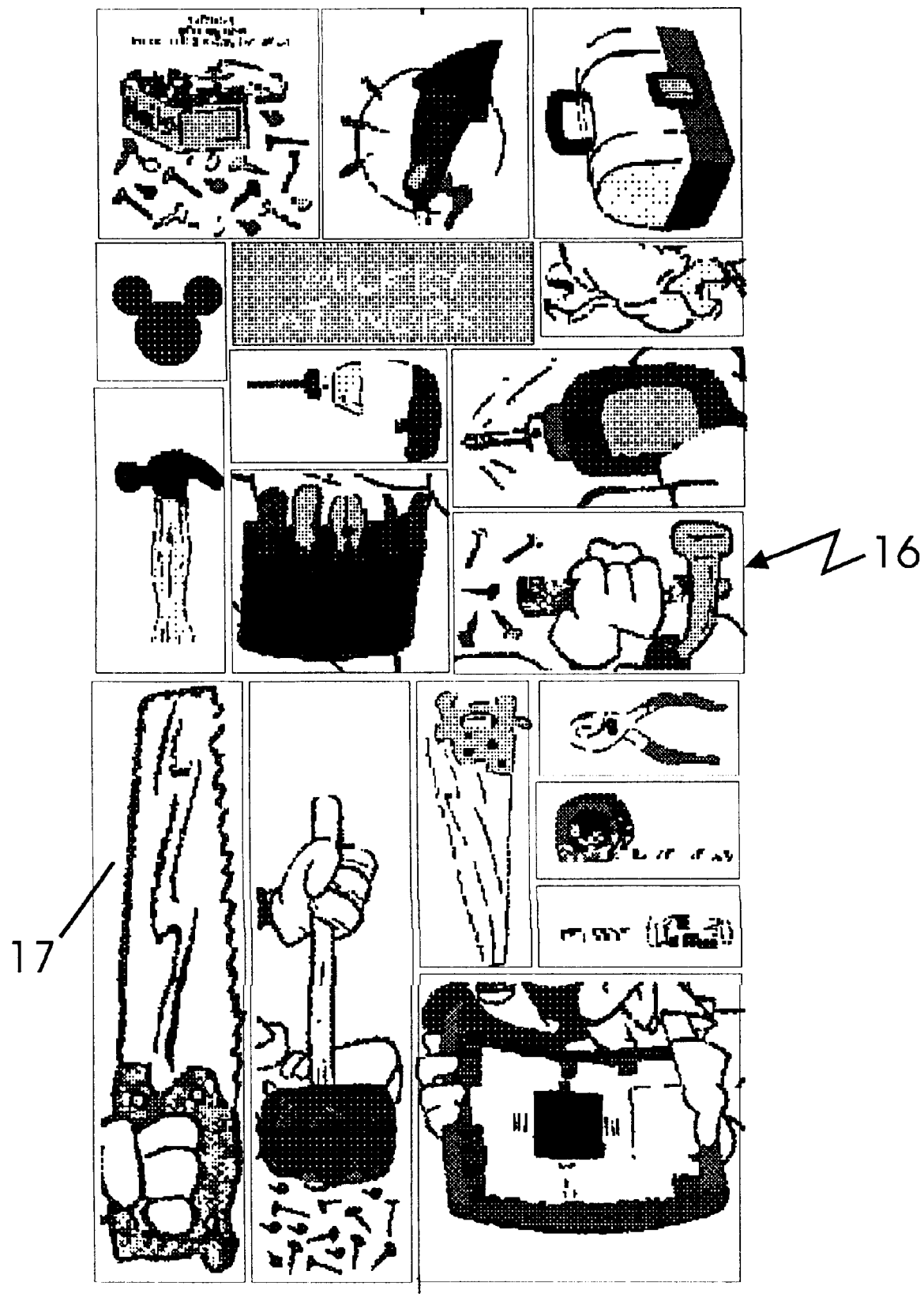
FIG. 4 is a sheet of randomly positioned adhesive pressure stickers including the adhesive pressure sticker of a third portion of the image as disclosed in exploded form in FIG. 3, this image corresponding to the second marking pen developed portion of the image configuration of FIG. 3, this pressure sticker image being transferably moveable to be placed within the visible outline as disclosed in FIG. 3 over the marking pen developed second portion to complete the overall image.

In accordance with one feature of the present invention, the same contact pen 7 can be employed by a player not only with the invisible ink image coloring game 4 of FIG. 2 but can also be employed by a player with the partial invisible ink image and sticker game 6 as illustrated in FIGS. 3 and 4 of the drawings. In this game, as can be seen in FIG. 3 of the drawings, a first portion 9 of a scene including an image (here shown as Mickey Mouse) is visibly printed on another sheet of booklet 3 and a second portion 11 of the image configuration contiguous with the first image portion 9 is invisibly printed on the same sheet. In the illustration of FIG. 3, a visible outline 12 surrounds what was the invisible second portion 11 to direct a player as to the location to contact with contact pen 7. It is to be understood that the present game is not to be considered as limited to the use of visible outline 12 since a careful study of the visible first portion 9 of the image can serve to indicate where the contact pen 7 is to be employed to develop second portion 11 of the image. It also is to be noted that a third visible outline 13 can be provided on the sheet of FIG. 3, as well as on the sheet of FIG. 2, if so desired, to include in invisible ink writing 14 a written statement which can be intellectually compatible with the scene disclosed on the game sheet.

Once the second portion 11 of the invisible image has been developed on the sheet of FIG. 3 by a player with contact pen 7, the player can then look to a separate adhesive pressure sticker sheet 16 which includes, among a random display of visible adhesive sticker images each of which are part of an overall image, a compatible visible partial sticker image third portion 17. The sticker image portion 17 is compatible with the developed invisible image portion 11 as shown in FIG. 3, and a player can selectively remove sticker image portion 17 from sheet 16 and pressure apply it over the second compatible image developed portion 11 within visible outline 12 of FIG. 3, thus completing the overall image on the sheet of FIG. 3.

It is to be understood that the present invention is not to be considered as limited to the adhesive pressure stickers disclosed but that other adhering image portions, such as magnetically sensitized portions capable of adheringly cooperating with a sheet of appropriately magnetically responsive material can be employed. Further, the two disclosed invisible ink image games 4 and 6, can be intermixed along with one or more sticker sheets 16 as part of an overall booklet without departing from the scope or spirit of this straightforward, enjoyable and challenging inventive game.

The invention claimed is:

1. An association and location identification game comprising: at least one sheet of material; said sheet having at least a first portion of less than an overall image visibly printed thereon and at least a second portion physically associated as a continuity with said first portion of said overall image forming part thereof to assist in completion of said overall image invisibly printed thereon as a latent image, said second portion being invisibly printed thereon as a latent image;

a marking means for developing said second latent image portion of said overall image to visibly identify in configuration form at least a third visible portion of said image to be located and associated with said second visibly developed latent image portion when so developed by said marking means; and, at least a compatible visible image third portion removed from said first and second portions of said image to be selected and movably associated with said second so marked and developed second image portion of said overall image to enhance comprehension of said first portion of less than an overall image.

2. The association game of claim 1, wherein said invisible latent image second portion includes more than one invisible latent image to be visibly developed and more than one removably compatible third portion for movable selection and association with each of said visibly developed latent image second portions.

3. The association game of claim 1, wherein said invisible latent image second portion can be developed to be a suggestive configuration for locating said third visible portion of said overall image.

4. The association game of claim 3, said configuration including a surrounding visible identifying outline.

5. The association game of claim 1, wherein said game includes at least two separate sheets, one sheet including said first visible portion and said second invisible latent image portion of said image and the other sheet including said third compatible visible portion of said image.

6. The association game of claim 1, said third compatible visible portion of said image being in the form of a press-on adhesive pressure sticker.

7. The association game of claim 1, wherein said game is in booklet form to include at least two types of image games at least one of said image game types including a first visible image portion and a second invisible latent image portion of said overall image to be developed and the other of said image type games being a fully visible selective latent color soluble dot treated image capable of being color developed by releasing the latent color image, said marking means being capable to develop both types of latent images.

8. The association game of claim 1, wherein said sheet includes a visibly defined area having an invisible written message therein, said marking means being capable of developing said invisibly written message.

9. An association game book package of sheets, said sheets of which include one of two types of images on at least one sheet of one of said image types comprising a first portion of less than an overall image visibly printed thereon and a second configuration completing portion of said overall image forming part thereof invisibly printed thereon as a latent image, said second latent image portion having no visibly defined area, wherein the location of said second latent image portion is not visibly marked on said sheet;

a marking means for developing said second configuration completing portion of said image to visibly identify for locating at least a third portion of said image to be associated with said second configuration completed visibly develop ed portion when so developed by said marking means wherein only a careful study of said first visible image determines the location of where the marking means is to be employed to visibly develop said second latent image portion; and, at least a compatible visible third image portion in the form of an adhesive pressure sticker removed from said fir st and second portions of said image to be located and selected on a separate random, pressure sticker sheet to be selectively moveable and associated with said second visibly developed configuration portion of said image to complete said overall image; said sheets further including on at least one sheet the other of said image types comprising a fully visible selectively latent color soluble dot treated image capable of being color developed by releasing the latent color image; said sheets also further including visibly defined areas, each having an invisibly intellectually compatible written message therein, said marking means being capable of developing all of said invisibly printed matter of said image types and said invisible writing within said visibly defined areas.

* * * * *